Jan. 12, 1960  G. W. STEVENSON  2,920,506
POSITIVE VARIABLE SPEED TRANSMISSION
Filed Nov. 18, 1958  2 Sheets-Sheet 1
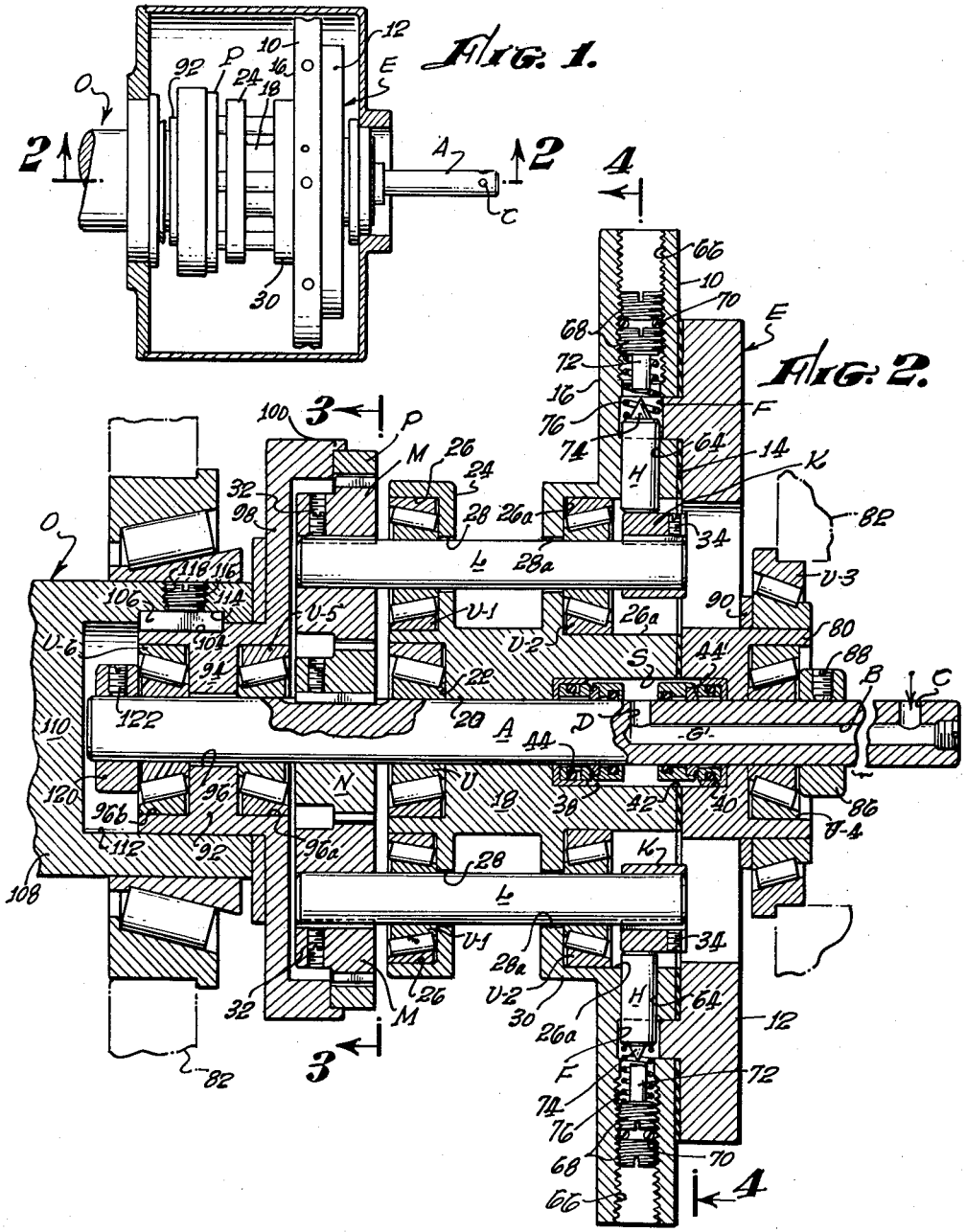
GERALD W. STEVENSON,
INVENTOR.
BY
William C. Babcock
ATTORNEY.

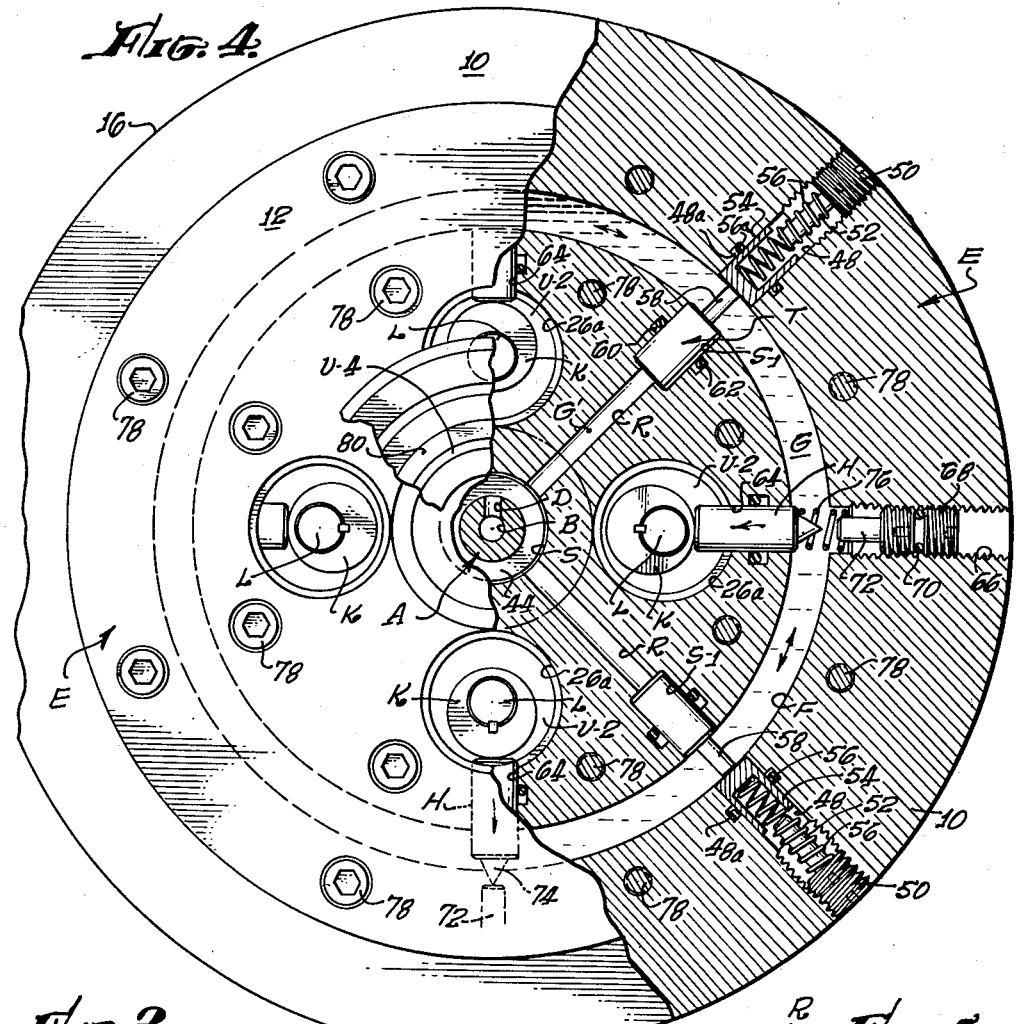

United States Patent Office 2,920,506
Patented Jan. 12, 1960

2,920,506

POSITIVE VARIABLE SPEED TRANSMISSION

Gerald W. Stevenson, Redondo Beach, Calif.

Application November 18, 1958, Serial No. 774,711

11 Claims. (Cl. 74—774)

The present invention relates generally to the field of transmissions, and more particularly to a hydraulic-mechanical transmission which permits any desired relative rotation of the driven shaft relative to the driving shaft including a one-to-one transmission of power.

While the advantages of hydraulic power transmissions have been known for a number of years, and for many types of use have substantially replaced mechanical transmissions, the majority of these hydraulic transmissions are objectionable from an operational standpoint for several reasons. The hydraulic transmissions previously available are in the main of complicated mechanical structure, have a rather low efficiency in the transmission of power therethrough, and require the services of a skilled mechanic to maintain them in operating condition. The operational disadvantages of conventional mechanical transmissions are so well known as to not require elaboration herein.

The primary purpose in devising the present invention is to provide a hydraulic-mechanical transmission which substantially eliminates the disadvantages of the previously available hydraulic operated transmissions as well as mechanical transmissions.

A major object of the present invention is to provide a transmission which is positive in operation and permits an infinitely variable torque output to be obtained from the driven shaft relative to the torque output in the driving shaft, and the variation in the torque output, as well as the degree of rotation of the driven shaft relative to the driving shaft, being controllable from a position remote from the transmission.

Another object of the invention is to provide a transmission which, while utilizing hydraulic fluids in the operation thereof, is free from the conventional turbine and stator or pumps common to the present-day conventional automatic transmission, with heat from the operation of the invention being completely eliminated when it is actuated to transmit rotational movement from the driving to the driven shaft with a one-to-one ratio.

Yet another object of the invention is to provide a transmission having a high operational efficiency, is relatively simple in structure, and will require a minimum of repair parts and maintenance attention during the life thereof.

These and other objects and advantages of the invention will become apparent from the following description of a preferred form thereof, and from the drawings illustrating that form, in which:

Figure 1 is a combined side elevational and longitudinal cross-sectional view of the invention showing the manner in which same connects a driving shaft to a driven member;

Figure 2 is a longitudinally extending cross-sectional view of the transmission shown in Figure 1 and taken on line 2—2 thereof;

Figure 3 is a transverse cross-sectional view of the invention taken on line 3—3 of Figure 2;

Figure 4 is a partial end elevational view of a portion of the invention, as well as a transverse cross-sectional view of a second portion thereof taken on line 4—4 of Figure 2; and Figure 5 is an enlarged fragmentary cross-sectional view of one of the valve members shown in Figure 4 in a fluid-flow restraining position.

Referring now to Figures 1 and 2 for the general arrangement of the invention, it will be seen that a driving shaft A is provided in which a longitudinally extending fluid passage B is formed which extends from a first port C to a second port D. A housing E, which will later be described in structural detail, is rotatably supported on drive shaft A, with this housing having a circular confined space F formed therein in which first hydraulic fluid G is contained, as may be seen in Figure 4.

A number of circumferentially spaced diametrically aligned pistons H are slidably mounted within the confines of housing E, with these pistons when reciprocated transversely relative to confined space F pumping the hydraulic fluid G situated therein backwardly and forwardly. Reciprocal movement of the pistons H is obtained by rotation of cams K, best seen in Figures 2 and 4.

The cams K are rigidly affixed to the forwardly disposed ends of a number of shafts L which are parallel to the drive shaft A, and are at least partially rotatably supported within the confines of the housing A. The rearward ends of shafts L have planetary gears M rigidly affixed thereto. A sun gear N is rigidly mounted on drive shaft A and is transversely aligned with the planetary gears M, and is at all times in toothed engagement therewith.

A driven member O is rotatably supported from the rearwardly disposed end portion of drive shaft A. Member O includes a ring gear P, which gear is at all times in toothed engagement with the planetary gears M. A number of radially extending, circumferentially spaced fluid passages R are formed in housing E and extend from a cavity S also formed therein which is in communication with port D. Each of the fluid-conducting passages R is in communication with one of a group of circumferentially spaced passage extensions S–1, as can be seen in Figure 4, with these extensions slidably supporting valve members T which can be moved to any one of a number of transverse positions relative to the confined space F, to either partially or completely obstruct flow of fluid G therein.

Outward movement of the valve members T to any desired fluid-flow restraining or fluid-flow obstructing position relative to the confined space F is attained by applying pressure to second hydraulic fluid G' situated in first port C, fluid passage B, second bore D, cavity S and the fluid-conducting passages R. Increases of pressure on second hydraulic fluid G' at the first port C, if of sufficient magnitude, results in increased flow of fluid through the passages R to move the valve members T outwardly to partially restrain backward and forward flow of fluid in the confined space F as it is so moved by the reciprocating action of the pistons H. As the drive shaft A is rotated, the sun gear N is of course concurrently rotated therewith, and the sun gear in turn causing rotation of the planetary gears M. The planetary gears M as they rotate cause rotational movement to be imparted through the shafts L to the cams K to cause same to reciprocate the pistons H previously mentioned, this reciprocal movement of the pistons resulting in movement of hydraulic fluid G in the confined space F first in one direction therein and then in the other.

As the planetary gears M rotate they tend to rotate relative to the driven member O, particularly if this member is subjected to a load. However, if it is desired to rotate the driven member O at a particular speed, or if it is desired to place a particular fraction of the torque developed by the drive shaft A thereon, or all of the torque that can be transmitted from the drive shaft to the driven shaft, flow of hydraulic fluid G' from the first port B to the passages R is caused to take place.

Flow of hydraulic fluid G' from first port C to passages R takes place by increasing the pressure thereon when it is desired to vary the torque or speed of the driven member O. It will be particularly noted that the second hydraulic fluid G' is separate and apart from the fluid G in the confined space F and has no connection whatsoever therewith. The fluid G' is merely the medium used to exert a force on the pistons T to cause partial obstruction of the confined space F. Thus, it will be apparent that the more outwardly disposed the pistons T are relative to the inwardly disposed surface of the confined space F, the greater will be the restraint imposed on the fluid G in flowing backwardly and forwardly in this space due to the reciprocal movement of the pistons H. The greater the restraint imposed on the fluid flow in the confined space F, the greater the resistance offered the cams K as they attempt to rotate relative to the pistons, with this resistance to rotation of the cams K in turn being transmitted from the shafts L back to the planetary gears M.

Thus, as the cams K are restrained or slowed down in their rotational movement, for the reasons above mentioned, the less the speed of rotation of the planetary gears M relative to sun gear N, and the less is the relative rotational movement of the planetary gears M relative to the driven member O. When the valve members T have been moved outwardly to positions to completely obstruct backward and forward movement of the fluid G in the confined space F, the pistons H are prevented from reciprocating, with the cams K then being held in a non-rotating position relative to housing E. The holding of the cams K in this position likewise results in the planetary gears M being held in a rigid non-rotatable position. Accordingly there can be no relative rotation between the sun gear N and planetary gears M, and as a result a one-to-one ratio of torque transmission is established between the driving shaft A and driven member O.

By varying the positions of the valve members T, to permit partial backward and forward movement of the first fluid G in confined space F, any desired degree of rotational movement of the driven member O, to the driving shaft A may be obtained, ranging from a one-to-one ratio to the situation where there is no rotation of the driven shaft O by virtue of the rotation of driving shaft A.

In structural detail, the housing E is preferably provided by removably combining a separate rotor 10 with a rotor adapter 12. Adjacently disposed side surfaces of the rotor and adapter are positioned in abutting fluid-sealing contact with a resilient gasket 14. Rotor 10 includes a generally circular portion 16 of greater diameter than any other component of the invention, which portion is transversely positioned relative to the drive shaft A. A hub 18 extends rearwardly from portion 16.

A longitudinally extending, centrally disposed first bore 20 is formed in a portion of hub 18, and develops at the rearward end thereof into a circular transversely positioned first recess 22. A flange 24 projects outwardly from the rearward portion of the hub 18, and has four circumferentially spaced second recesses 26 extending forwardly from the rearward face thereof. The second recesses 26 are in communication with coaxially aligned second bores 28 which extend forwardly therefrom.

As will be seen in Figure 2 a boss 30 of greater transverse cross-sectional area than hub 18 also extends rearwardly from rotor 10, and has forwardly extending third bores 28a formed therein which are in communication with third recesses 26a. Each second recess 26 and bore 28 is in coaxial alignment with a third recess 26a and bore 28. First recess 22 is of such dimensions as to snugly engage a conventional roller bearing U which rotatably engages and supports a portion of drive shaft A, as best seen in Figure 2. Four conventional roller bearings U-1 are positioned within the confines of second recesses 26 and rotatably support rearwardly disposed portions of the shafts L.

The forwardly situated portions of shafts L are rotatably supported by four roller bearings U-2 positioned in the rearwardly disposed parts of the third recesses 26a. Shafts L project rearwardly beyond bearings U-2 and have the planetary gears M rigidly keyed thereto and held in fixed positions thereon by screws 32 or other suitable fastening means. Cams K are also keyed to the forwardly disposed portions of shafts L, and are held in fixed positions thereon within the forward extremities of third recesses 26a by screws 34.

Cams K, as may best be seen in Figure 4, are so oriented and rigidly affixed to shafts L that when two diametrically opposed cams have advanced the pistons H outwardly the maximum distance possible, the other two cams have retracted to positions where the pistons controlled by their movement have moved inwardly the maximum distances possible. Due to alternate outward and inward movement of each pair of diametrically positioned pistons H, the hydraulic fluid G in space F is alternately caused to flow therein in clockwise and counterclockwise directions.

Cavity S, best seen in Figure 2, is defined by two coaxially aligned sections 38 and 40 formed in the rotor 10 and adapter 12 respectively, together with the wall surface defining a centrally disposed opening 42 in gasket 14. Two ring-shaped fluid packers 44 and 44' are positioned in the cavity sections 38 and 40 respectively on each side of second port D. Packers 44 and 44' sealingly engage the interior surfaces of the cavity sections as well as exterior surface portions of drive shaft A.

Circular portion 16 of the rotor has a number of fourth bores 48 extending inwardly from the outer circumferential edge thereof to confined space F, which fourth bores are in radial alignment with the fluid conducting passages R. The outer interior portion of each fourth bore 48 is tapped and is engaged by a threaded plug 50 which has a prong 52 projecting from the inwardly positioned end thereof. Each fourth bore 48 also has a cup-shaped guide 54 slidably disposed therein which is at all times urged inwardly toward drive shaft A by a compressed helical spring 56. Each spring 56 encircles one of the prongs 52, with the outer end of each spring abutting against one of the plugs 50 and the inner end of each spring in pressure contact with the innermost interior surfaces of one of the guides 54. Bores 48 are preferably formed with an intermediately disposed, circumferentially extending recess 48a, as shown in Figure 4, wherein resilient O-rings 56a are positioned to at all times slidably and sealingly engage the exterior surfaces of guides 54.

The passage extensions S-1 slidably support the valve members T which are cylindrical and have outwardly projecting rigid extensions 56 that are rigidly connected to the inwardly disposed ends of guides 54. Each passage extension S-1 has a circumferentially extending intermediately positioned recess 60 extending outwardly therefrom in which on O-ring 62, or other suitable fluid-sealing member, is disposed that is in slidable fluid-sealing contact with the valve member T situated in that particular recess 60. Due to the inwardly directed force exerted by compressed springs 56, each assembly of valve member T, extension 58 and guide 54 tends to remain in the position shown in Figure 4 until such time as outwardly directed forces are exerted on members T.

Third recesses 26a, as can best the seen in Figures 2 and 4, have fifth bores 64 extending outwardly therefrom in rotor portion 16. Bores 64 terminate at the inwardly disposed surface defining confined space F. A number of tapped sixth bores 66 are also formed in rotor portion 16 that are in radial alignment with fifth bores 64. Bores 66 lead inwardly from the outer circumferential surface of portion 16 and terminate at the outer circumferential surface of space F.

Each of the sixth bores 66 has a pair of threaded plugs 68 disposed therein, between which a resilient sealing member 70 is compressed. The innermost of each pair of plugs 68 has an extension 72 projecting therefrom which terminates at substantially the outer surface of confined space F. A projection 74 is formed on the outer end of each piston H. Compressed helical springs 76 are provided, the end portions of which envelope adjacently disposed extensions 72 and projections 74. Springs 76 at all times tend to move pistons H inwardly relative to space F.

Rotor adapter 12, best seen in Figure 4, is removably held in position on rotor 16 by a number of radially and circumferentially spaced bolts 78 which threadedly engage aligned tapped bores (not shown) in both the rotor and adapter. A cylindrical, centrally disposed tubular member 80 projects forwardly from adapter 12. The exterior surface of member 80 is rotatably engaged by a conventional roller bearing U-3 affixed to a suitable support 82, shown in phantom line. The precise structure of support 82 will depend on the environment in which the invention is used. A conventional roller bearing U-4 is supported on the interior of tubular member 80 and this bearing rotatably engages the exterior surface of drive shaft A. A first collar 86 is removably affixed to shaft A by a set screw 88 and serves to prevent inadvertent forward displacement of bearing U-4 from the confines of member 80. Bearing U-3 is separated from the forward face of rotor 12 by a washer or spacer 90.

Driven member O is preferably formed by providing a first member 92 which includes a hub 94 through which a centrally disposed bore 96 extends on the longitudinal axis thereof, with the bore 96 developing on the forwardly and rearwardly disposed ends thereof into two enlarged portions 96a and 96b respectively, in which two roller bearing assemblies U-5 and U-6 are supported. The bearings U-5 and U-6 rotatably support sections of drive shaft A which extend therethrough. Drive shaft A also extends through bore 96.

Hub 94 on the forward portion thereof develops into a transversely disposed outwardly extending circular plate 98 which has a rim 100 projecting forwardly therefrom to which a ring gear P is affixed, which gear is at all times in toothed engagement with planetary gears M. The hub 94 as best seen in Figure 2 has a longitudinally extending slot 104 formed therein in which a key 106 is disposed.

A second member 108 which forms a part of driven member O is a shaft 110 which is formed with a cylindrically shaped cavity 112 on the forward end portion thereof of such transverse cross section as to snugly engage the surface of hub 94. A slot 114 is formed in the surface defining cavity 112, and is removably engaged by key 106 to prevent relative rotational movement between the hub 94 and shaft 110. A screw 116 threaded into a tapped bore 118 formed in shaft 110 serves to maintain key 106 in engagement with slots 114 and 104. The most rearwardly disposed portion of drive shaft A has a second collar 120 mounted thereon by a screw 122 to maintain the first drive part 92 in a fixed position relative to housing E.

The operation of the invention has been previously explained in detail and need not be repeated.

Although my invention is fully capable of achieving the results and providing the advantages hereinbefore mentioned, it is to be understood that it is merely the presently preferred embodiment thereof, and that I do not mean to be limited to the details of construction above described other than as defined in the appended claims.

I claim:

1. A transmission which includes: a driving shaft; a plurality of pistons; a plurality of valve members; a plurality of cams; a plurality of planetary gears; a sun gear rigidly affixed to said driving shaft; a plurality of shafts, each of said shafts having one of said planetary gears affixed to one end portion thereof and one of said cams to the opposite end portion thereof, with each of said planetary gears in toothed engagement with said sun gear, and each of said cams in sliding contact with an end portion of one of said pistons; a housing rotatably supported on said drive shaft, said housing formed with an endless confined space in the interior thereof that is filled with a first hydraulic fluid, said housing slidably supporting said pistons and valve members in circumferentially spaced relationship for radial movement relative to said confined space, said housing rotatably supporting said shafts in fixed relationship relative to said driving shaft and said cams at various positions of rotation relative to one another, and a plurality of fluid passages formed in said housing and in communication with said pistons through which a second hydraulic fluid can be discharged under pressure from a source outside said housing to cause said valve members to move outwardly in said confined space to restrain flow of said first fluid therein; and a driven member rotatably mounted on said driving shaft, said driven member including gear means at all times in toothed engagement with said planetary gears, with said driving shaft when rotated tending to rotate said planetary gears and gear means relative said sun gear and to cause said pistons to alternately reciprocate to cause said first fluid to flow backwardly and forwardly in said confined space, but said backward and forward flow being restricted by the degree said valve members extend outwardly in said confined space, and the greater the restriction of said flow by increasing the pressure on said second fluid the less will be the relative rotation of said planetary gears and gear means relative to said sun gear and the closer will the speed of rotation of said driven member and the torque delivered thereto approach the speed of rotation and torque of said driven member until a ratio of one-to-one is actually reached.

2. A transmission as defined in claim 1 in which said housing includes a circular outwardly extending portion in which said confined space is formed in a circular configuration, said housing formed with a centrally located longitudinally extending first bore which on the rearward end thereof develops into a first recess and on the forward end thereof into a cavity, with said plurality of fluid passages being circumferentially spaced and extending radially outward from said cavity and at all times being in communication therewith, said fluid passages terminating in extensions thereof which are of enlarged transverse cross sections and in communication with said confined space, with said extensions serving to slidably support said valve members therein, and said valve members capable of being actuated to move outwarldy relative to said confined space and increasing the pressure on said second hydraulic fluid; and means to discharge said second hydraulic fluid at a desired pressure into or out of the confines of said cavity as said driving shaft is rotated.

3. A transmission as defined in claim 2 in which a number of circumferentially spaced longitudinally separated second and third recesses are formed in said housing, said recesses having second and third bores, respectively, in communication therewith, and said second and third bores being in coaxial alignment and extending toward one another, and first bearing means being disposed in said first bore which rotatably engage and support said driving shaft, second and third bearing means being disposed in said second and third recesses which rotatably engage and support said shafts, with said planetary gears disposed rearwardly of said second bearing means, and said cams supported forwardly of said third bearing means.

4. A transmission as defined in claim 3 in which a plurality of circumferentially spaced, radially extending fourth bores are formed therein which are in coaxial alignment with said fluid passages, and each of said fourth bores being normally engaged by removable plug means, which plug means can be removed to permit the introduction of said first hydraulic fluid into the confines of said confined space.

5. A transmission as defined in claim 4 in which said valve members are each provided with outwardly projecting extensions which have substantially the same length as the height of a transverse section of said confined space, with a plurality of rigid guides being provided that are slidably and sealingly disposed in said fourth bores and have said extensions rigidly connected thereto, and compressed spring means are provided which are situated within said fourth bores to at all times tend to move said guides, extensions and valve member toward said drive shaft.

6. A transmission as defined in claim 5 in which said housing has a number of circumferentially spaced, radially extending fifth bores formed therein in communication with said third recesses and extending outwardly therefrom to said confined space, with each of said fifth bores slidably supporting one of said valve members, said cams due to the rotational positioning thereof being out of phase and by slidably contacting said pistons causing same to reciprocate transversely relative to said confined space, and spring means are provided which at all times tend to maintain said pistons in slidable contact with said cams.

7. A transmission as defined in claim 6 in which a plurality of circumferentially spaced, radially extending sixth bores are formed in said housing which are coaxially aligned with said fifth bores and are in communication with said confined space, said sixth bores having fluid-sealing means removably disposed within the confines thereof, said fluid-sealing means being provided with inwardly extending extensions which terminate adjacent to the outwardly disposed surface defining said confined space, and said extensions serving as stops to limit the outward movement of said pistons.

8. A transmission as defined in claim 7 in which first and second longitudinally separated, transversely extending first and second bores are formed in said drive shaft which are connected by a longitudinally extended fluid-conducting passage formed within the confines thereof, said second port being situated within the confines of said first cavity and at all times in communication therewith to permit said second fluid to be discharged through said first and second ports and said fluid-conducting passage in said drive shaft to actuate said valve members to move outwardly into said confined space to restrict the backward and forward flow of said first hydraulic fluid therein to the desired degree.

9. A transmission as defined in claim 8 in which two longitudinally spaced rotary fluid-sealing members are disposed in the end portions of said cavity and on opposite sides of said second port, to prevent said second hydraulic fluid entering said cavity from passing therefrom other than through said fluid passages and said second port.

10. A transmission as defined in claim 9 in which said driven member includes a hub portion rotatably supported on the rearward part of said driving shaft, and said driven member having a flange extending outwardly therefrom which develops into a circumferentially extending rim on which said gear means is mounted, and bearing means being provided that at all times maintain said driven member in longitudinal alignment with said housing.

11. A transmission which includes: a driving shaft formed with longitudinally extending fluid-conducting means which extend from a first intermediately positioned port on said shaft to a second intermediately situated port on said shaft; a housing rotatably supported on said shaft and extending longitudinally thereon from both sides of said second port, said housing formed with an internally disposed cavity at all times in communication with said second port, a plurality of radially extending circumferentially spaced fluid-conducting passages extending outwardly from said cavity, a plurality of first bores coaxially aligned with said passages and in communication with the outer extremities thereof, an endless elongate confined space in communication with each of said first bores, a plurality of circumferentially spaced longitudinally extending openings disposed between said fluid-conducting passages, and a plurality of second diametrically aligned second bores that are in communication with said openings and said confined space; a sun gear rigidly affixed to said shaft adjacent an end portion of said housing; a plurality of planetary gears disposed about said sun gear and in engagement therewith; a plurality of first shafts disposed substantially parallel to said driving shaft and coaxially aligned with said openings and rotatably supported from said housing, said first shafts rigidly connected to said planetary gears; a driven member rotatably supported on said driving shaft, said driven member including gear means which engage said planetary gears; a plurality of pistons slidably mounted in said second bores; rotatable cam means rigidly mounted on said first shafts and in rotatably sliding contact with said pistons, said cam means of such configuration that when said first shafts are concurrently rotated at a uniform rate said diametrically opposed pistons are identically disposed relative to said confined space; a plurality of valve members slidably supported in said first bores and movable to a transversely disposed fluid-obstructing position in said confined space; and means to discharge hydraulic fluid under pressure into said first port as said drive shaft rotates to force said fluid through said fluid-conducting means, second port into said cavity and through said fluid-conducting passages to said valve members, to force said valve members a desired distance across said confined space to prevent the backward and forward flow of a body of hydraulic fluid contained therein as said drive shaft is rotated to cause concurrent rotation of said planetary gears, first shafts cam means and reciprocal movement of said pistons which cause said backward and forward flow of said liquid with the degree of restriction of said backward and forward flow brought on by the reciprocation of said pistons determining the relative rotational movement of said planetary gears relative to said driving shaft, and this variable relative rotation of said planetary gears determining the variable rate at which said driven member will be rotated relative to the rate of rotation of said drive shaft.

References Cited in the file of this patent

UNITED STATES PATENTS

| 912,487 | Ramsey | Feb. 16, 1909 |
| 2,153,796 | Fletcher | Apr. 11, 1939 |
| 2,665,595 | Moon | Jan. 12, 1954 |
| 2,782,660 | Davis | Feb. 26, 1957 |

FOREIGN PATENTS

| 471,444 | Germany | Feb. 12, 1929 |